(12) United States Patent
Sipes (10) Patent No.: US 11,146,913 B2
(45) Date of Patent: Oct. 12, 2021

(54) LOCATION BASED MOBILE MESSAGING SHOPPING NETWORK

(71) Applicant: nJoy Worldwide, Inc., Beverly Hills, CA (US)

(72) Inventor: Andrew Sipes, Beverly Hills, CA (US)

(73) Assignee: nJoy Worldwide, Inc., Beverly Hills, CA (US)

(*) Notice: Subject to any disclaimer, the term of this patent is extended or adjusted under 35 U.S.C. 154(b) by 0 days.

(21) Appl. No.: 16/889,466

(22) Filed: Jun. 1, 2020

(65) Prior Publication Data

US 2020/0382899 A1 Dec. 3, 2020

Related U.S. Application Data

(60) Provisional application No. 62/854,940, filed on May 30, 2019.

(51) Int. Cl.
*H04W 24/00* (2009.01)
*H04W 4/021* (2018.01)
*G06Q 30/06* (2012.01)
*H04L 29/06* (2006.01)
*H04W 4/14* (2009.01)

(52) U.S. Cl.
CPC ........ *H04W 4/021* (2013.01); *G06Q 30/0605* (2013.01); *G06Q 30/0633* (2013.01); *H04L 65/1069* (2013.01); *H04W 4/14* (2013.01)

(58) Field of Classification Search
CPC .... H04W 4/021; H04W 4/14; G06Q 30/0633; G06Q 30/0605; H04L 65/1069; H04L 51/046; H04L 51/20

USPC ...................................................... 455/456.3
See application file for complete search history.

(56) References Cited

U.S. PATENT DOCUMENTS

| | | | | |
|---|---|---|---|---|
| 8,135,413 | B2* | 3/2012 | Dupray | H04W 4/029 |
| | | | | 455/456.1 |
| 8,155,672 | B2* | 4/2012 | Bajpai | H04W 4/02 |
| | | | | 455/456.5 |
| 9,710,821 | B2* | 7/2017 | Heath | G06Q 30/02 |
| 9,824,387 | B2* | 11/2017 | Haver | G06Q 30/0639 |
| 10,127,564 | B2* | 11/2018 | Heath | G06Q 30/02 |
| 10,140,620 | B2* | 11/2018 | Heath | G06Q 30/02 |
| 10,217,117 | B2* | 2/2019 | Heath | G06Q 30/06 |
| 10,251,128 | B2* | 4/2019 | Nguyen | H04W 4/14 |

(Continued)

OTHER PUBLICATIONS

International Search Report and Written Opinion dated Sep. 21, 2020 for International Application No. PCT/US20/35583.

*Primary Examiner* — Amancio Gonzalez
(74) *Attorney, Agent, or Firm* — Avyno Law P.C.

(57) ABSTRACT

A location-based mobile messaging shopping network is provided that acquires location data from a mobile computing device (MCD), receives the location data at a server, generates a collection of businesses and individual sellers offering goods or services in the location associated with the location data based on the service area of the businesses and individual sellers and user location, and establishes a real-time communication channel between the businesses and MCD. The MCD displays various real-time communication channels to enable the user of the MCD to communicate with the businesses, and enables the user to purchase goods and services directly through the real-time communication channels displayed on the MCD.

20 Claims, 11 Drawing Sheets (56) References Cited

U.S. PATENT DOCUMENTS

| | | | |
|---|---|---|---|
| 2007/0136760 A1* | 6/2007 | Edwards | G06Q 30/0261 |
| | | | 725/62 |
| 2011/0191432 A1 | 8/2011 | Layson, Jr. | |
| 2011/0320318 A1 | 12/2011 | Patel et al. | |
| 2012/0209749 A1 | 8/2012 | Hammad et al. | |
| 2012/0323690 A1 | 12/2012 | Michael | |
| 2013/0066731 A1* | 3/2013 | Finnegan | G06Q 50/265 |
| | | | 705/15 |
| 2014/0156407 A1 | 6/2014 | Dinardo | |
| 2014/0316897 A1* | 10/2014 | Montanaro | H04W 4/023 |
| | | | 705/14.58 |
| 2018/0232726 A1* | 8/2018 | Sherwin | G06Q 20/0855 |
| 2021/0063526 A1* | 3/2021 | Aasen | H04B 11/00 |

* cited by examiner

LOCATION BASED MOBILE MESSAGING SHOPPING NETWORK

TECHNICAL FIELD

The present invention relates generally to mobile and computer-based shopping and more particularly to mobile and computer-based shopping for goods and services from local businesses and individual sellers.

BACKGROUND

With the widespread use of mobile devices for activities that used to be carried out primarily on computers, such as shopping, mobile web browsers and apps have become a primary communication channel between businesses and individual sellers selling goods and services and purchasers of goods and services.

Local merchants and individual sellers often have great difficulty offering and selling goods and services on mobile devices given technical limitations of posting all their goods and services to websites on mobile devices and the difficulty of attracting local shoppers to their websites. Many local businesses and individual sellers do not have websites, mobile-optimized websites, or mobile apps. If they do, it is difficult for purchasers to know which businesses and individual sellers service the location they are in at any moment. If they do, it is difficult for purchasers to navigate across mobile websites to discover what local businesses and individual sellers have in stock for purchase at a particular time. There is, therefore, a need for local businesses and individual sellers selling items to be able to offer their goods and services effectively to purchasers on mobile devices.

SUMMARY

The present disclosure provides computer systems and methods configured for providing a location-based mobile shopping computer network connecting local businesses and individual sellers selling items with local shoppers. The analysis and use can entail accessing a location-based mobile shopping computer network, retrieving a network of local businesses and individual sellers selling goods and services in real-time messaging groups via one or more communication channels or options, communicating with local businesses and individual sellers in these groups, communicating with one local business or individual seller in these groups or with multiple local businesses and sellers simultaneously in these groups, and purchasing goods and services from local businesses and individual sellers.

In one embodiment of the present invention, provided is a computer system which: (a) receives a location identifier and identifying information of the requesting user; (b) retrieves a group of local businesses and individual sellers offering goods and services for sale in the location; (c) displays the local businesses and individual sellers in individual real-time chat groups for the purchaser to access.

In some aspects, users communicate through real-time messaging with businesses or individual sellers in real-time chat groups.

In some aspects, goods and services are displayed by the businesses or individual sellers in real-time chat group messages.

In some aspects, a price or availability of a good or service is displayed by the businesses or individual sellers in real-time chat group messages.

In some aspects, the goods or services consist of a service, a tangible good or a digital good.

In some aspects, the system displays the name, stock keeping unit, bar code, identification number, identification code, description, merchandise image, merchandise video, color, vendor, manufacturer, inventory level, internet address and price of the good or service.

In some aspects, the code further configures the system to retrieve multiple users into a real-time messaging group and displays the multiple users and local businesses and individual sellers.

In some aspects, the code further configures the system to send a user a notification when additional messages or goods or services are delivered into a real-time messaging group.

In some aspects, the notification is a screen instant notification, a text message, a push notification, an electronic instant message, or an email message.

In some aspects, the good or service is displayed on an interface configured to allow a user to purchase the good or service, to retrieve more information about the good or service, or learn more about the business or individual seller offering the good or service.

In some aspects, the code further configures the system to initiate a search in a real-time messaging group or groups for a good or service.

In some aspects, the code further configures the system to initiate a search in a real-time messaging group for groups for a category of good or service.

In some aspects, the code further configures the system to upload an image, photograph or video of, but not limited to, a product or service, in a real-time messaging group.

In some respects, the image, photograph, or video is displayed on an interface configured to allow an individual or business to search for a product or service that is related to the image, photograph or video.

In some aspects, the code further configures the system to open and close real-time messaging groups from access, temporarily or permanently.

Also provided, in one embodiment of the present invention, is a computer system which: (a) receives a location identifier and identifying information of the requesting user; (b) retrieves a group of local businesses and individual sellers offering goods and services for sale in the location; (c) allocates the local businesses and individual sellers into real-time chat groups based on an algorithm whose instructions calculate the set of messaging groups to render for the user based on, but not limited to, characteristics of the location, number of available businesses and individual sellers, time of day, time of year; (d) renders the local businesses and individual sellers aggregated in real-time chat groups, displayed on an interface configured to allow a user to communicate with multiple local businesses and individual sellers simultaneously; and (e) make purchases.

In some aspects, the real-time chat groups are aggregated around subject-based categories such as, but not limited to, shopping, dining, shoes, gourmet, holiday shopping, hardware, groceries, and fashion.

In some aspects, the real-time chat groups are aggregated around time-based categories such as, but not limited to, local events, seasons, and festivals.

In some aspects, the code further configures the system to initiate a search in a real-time messaging group for a business or individual seller.

In some aspects, the code further configures the system to initiate a search in a real-time messaging group for a category of business or individual seller.

In some respects, the code further configures the system to (a) allow a user to create their own real-time messaging group; (b) retrieve a group of local businesses and individual sellers offering goods and services for sale in the location; (c) display the local businesses and individual sellers on an interface configured so they can be selected and invited into the user's own real-time messaging group; and (d) save the real-time messaging group to access later.

In some respects, the code further configures the system to (a) allow a business or individual seller to create their own real-time messaging group; and (b) save the real-time messaging group to access later.

In some aspects, the code further configures the system to display local businesses and individual sellers on an interface configured so they can be selected and invited into the business's or individual seller's own real-time messaging group.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

An approach is described for a computer system and method configured for providing a location-based mobile shopping computer network connecting local businesses and individual sellers selling goods and services with local shoppers. While the detailed description below discusses connecting local businesses and/or individual sellers selling goods and services to local shoppers, it is recognized that the local shopping network may also, without departing from the scope of the invention, connect local shoppers to the sellers of specific goods or specific branded goods (sold, for example, through local shops) and/or to global retail chains or other sellers of goods and/services within a given area.

Figure 1:
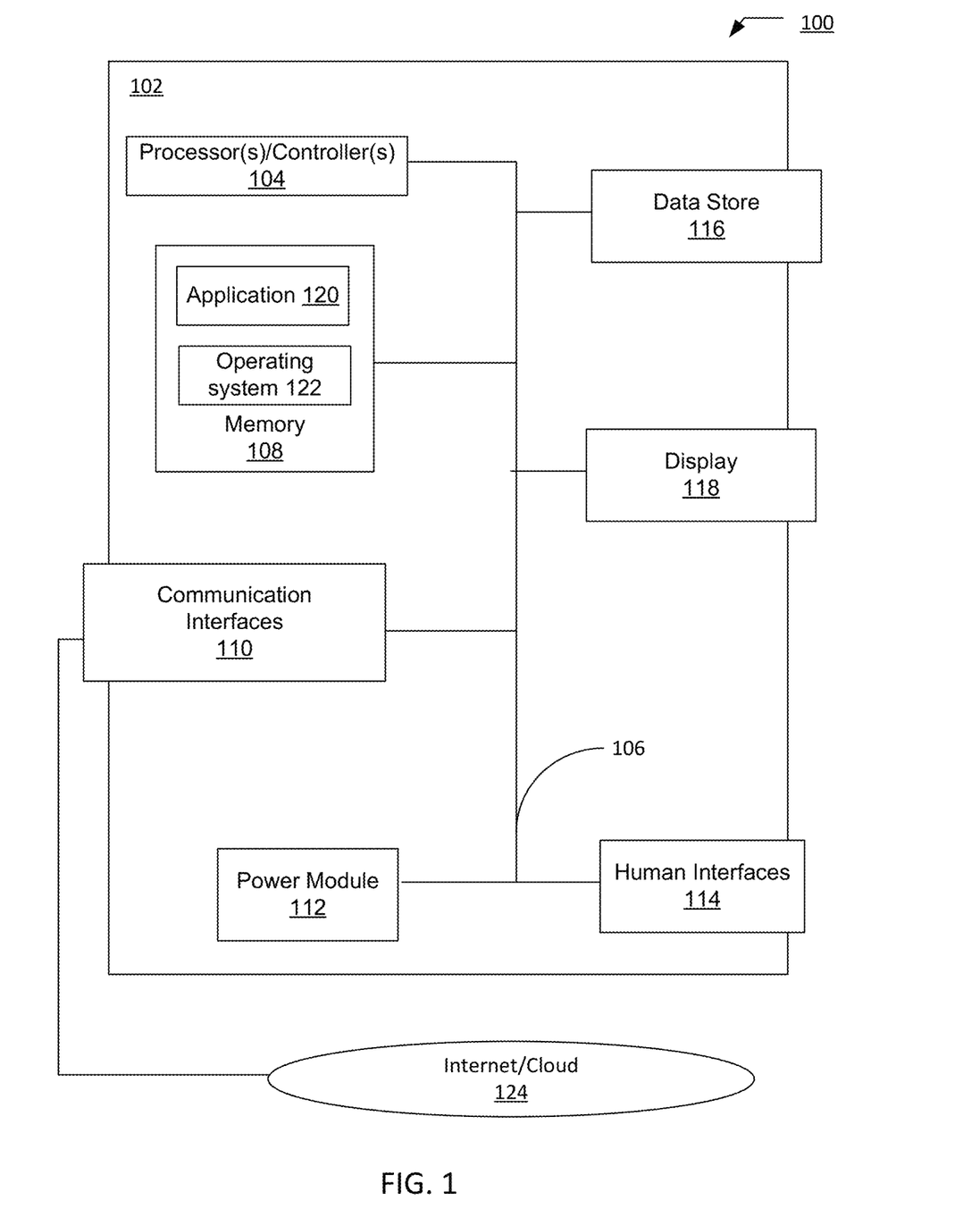
FIG. 1 is a block diagram 100 of a server 102 executing instructions for a location-based mobile messaging shopping approach in accordance with an example implementation of the invention.

In FIG. 1, a block diagram 100 of a server 102 executing instructions for a location-based mobile messaging shopping approach is depicted in accordance with an example implementation of the invention. The server 102 has at least one processor or controller 104 coupled to a memory 108, communication interfaces 110 (e.g., wireless and/or wired) power module 112, human interface 114 (e.g., mouse, keyboard, microphone, camera), data store 116 (e.g., cloud storage, external database, internal disk), display 118 (e.g., graphics/video card, monitor) by a bus 106 (e.g., data, address, and/or power). The memory may be subdivided into an application memory 120 and operating system memory 122. The memory 108 may be RAM/ROM/EEPROM/PROM to give but a few examples. The communication interfaces 110 connect the server 102 with one or more other networks, such as the internet/cloud 124. In other implementations, other networks may be accessed prior to or in addition to the internet cloud 124.

Figure 2:
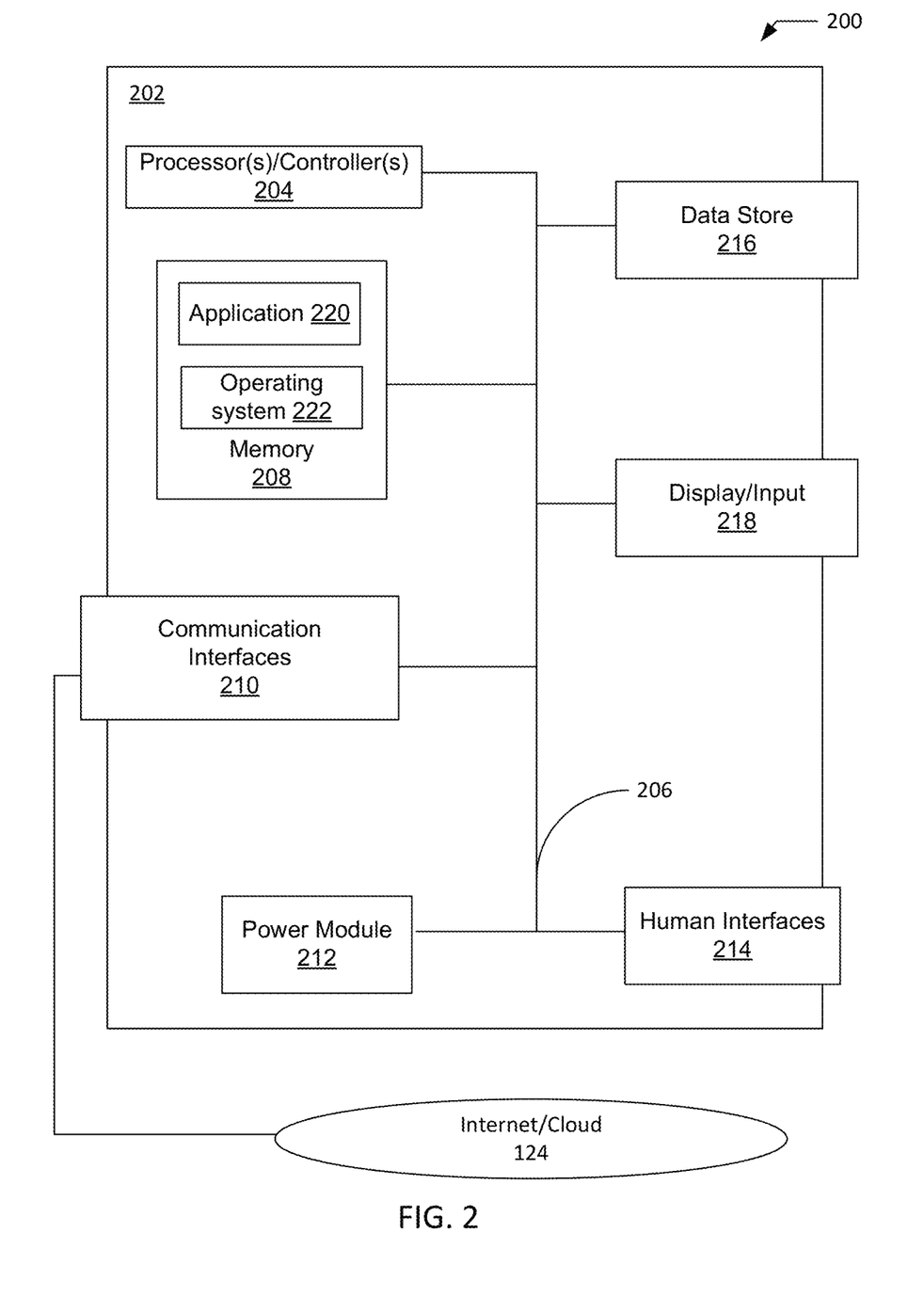
FIG. 2 is a block diagram 200 of a computing device 202 configured to execute instructions for communicating with the server 102 of FIG. 1 in accordance with an example implementation of the invention.

Turning to FIG. 2, a block diagram 200 of a computing device (e.g., desktop, laptop, tablet, smartphone, electronic book reader, wearable device, any type of portable computing device, or any other type of computer) 202 executing instructions for communicating with the server 102 of FIG. 1 is depicted in accordance with an example implementation of the invention. The computer 202 has at least one processor or controller 204 coupled to a memory 208, communication interfaces 210 (e.g., wireless and/or wired) power module 212, human interface 214 (e.g., mouse, keyboard, microphone, camera), data store 216 (e.g., cloud storage, external database, internal disk), display 218 (e.g., graphics/video card, monitor) by a bus 206 (e.g., data, address, and/or power). The memory may be subdivided into an application memory 220 and operating system memory 222. The memory 208 may be RAM/ROM/EEPROM/PROM to give but a few examples. The communication interfaces 210 connect the computer 202 with one or more other networks, such as the internet/cloud 124. In other implementations, other networks may be accessed prior to or in addition to the internet cloud 124.

Figure 3:
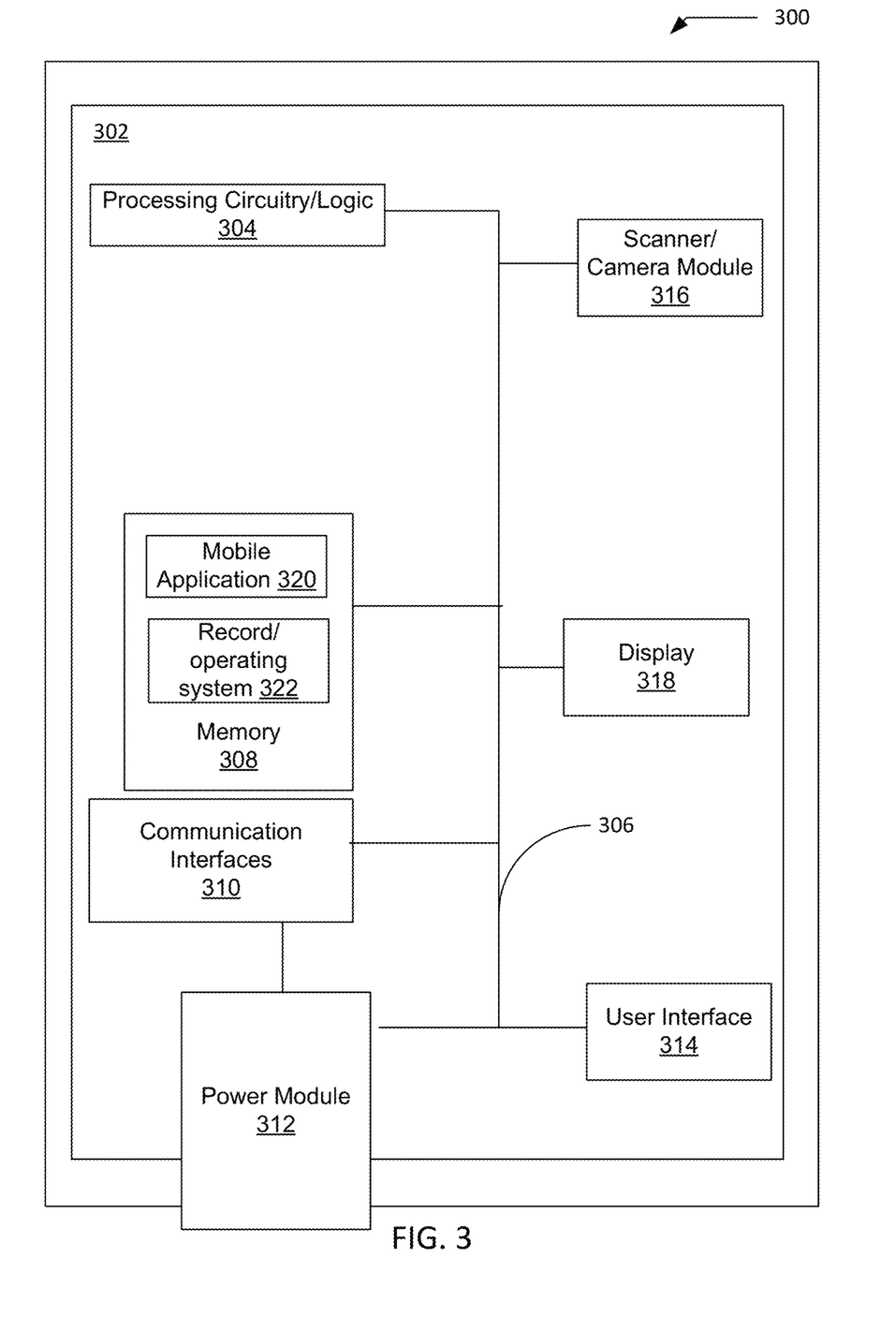
FIG. 3 is a block diagram 300 of a mobile computing device (MCD) 302 configured to execute instructions for communication with the server 102 of FIG. 1 in accordance with an example implementation.

In FIG. 3, a block diagram 300 of a mobile computing device (MCD) (e.g., a smartphone, tablet, electronic book reader, wearable device, or any other type of portable computing device) 302 executing instructions for communication with the server 102 of FIG. 1 is depicted in accordance with an example implementation. The MCD 302 has at least one processor or controller 304 coupled to a memory 308, communication interfaces 310 (e.g., cellular, wireless internet, Bluetooth, GPS), power module 312 that may also be coupled with the communication interfaces via USB type (A, B, C, etc. . . . ) connector, user interface 314 (e.g., touch screen, microphone), scanner/camera module 316, display 318 (e.g., graphics/video card, monitor) by a bus 306 (e.g., data, address, and/or power). The memory may be subdivided into a mobile application memory 320 and operating system/records memory 322. The memory 108 may be RAM/ROM/EEPROM/PROM to give but a few examples. The communication interfaces 110 connect the server 102 with one or more other networks, such as the internet/cloud 124 and also may connect to a cellular network. In other implementations, other networks may be accessed prior to or in addition to the internet cloud 124.

Figure 4:
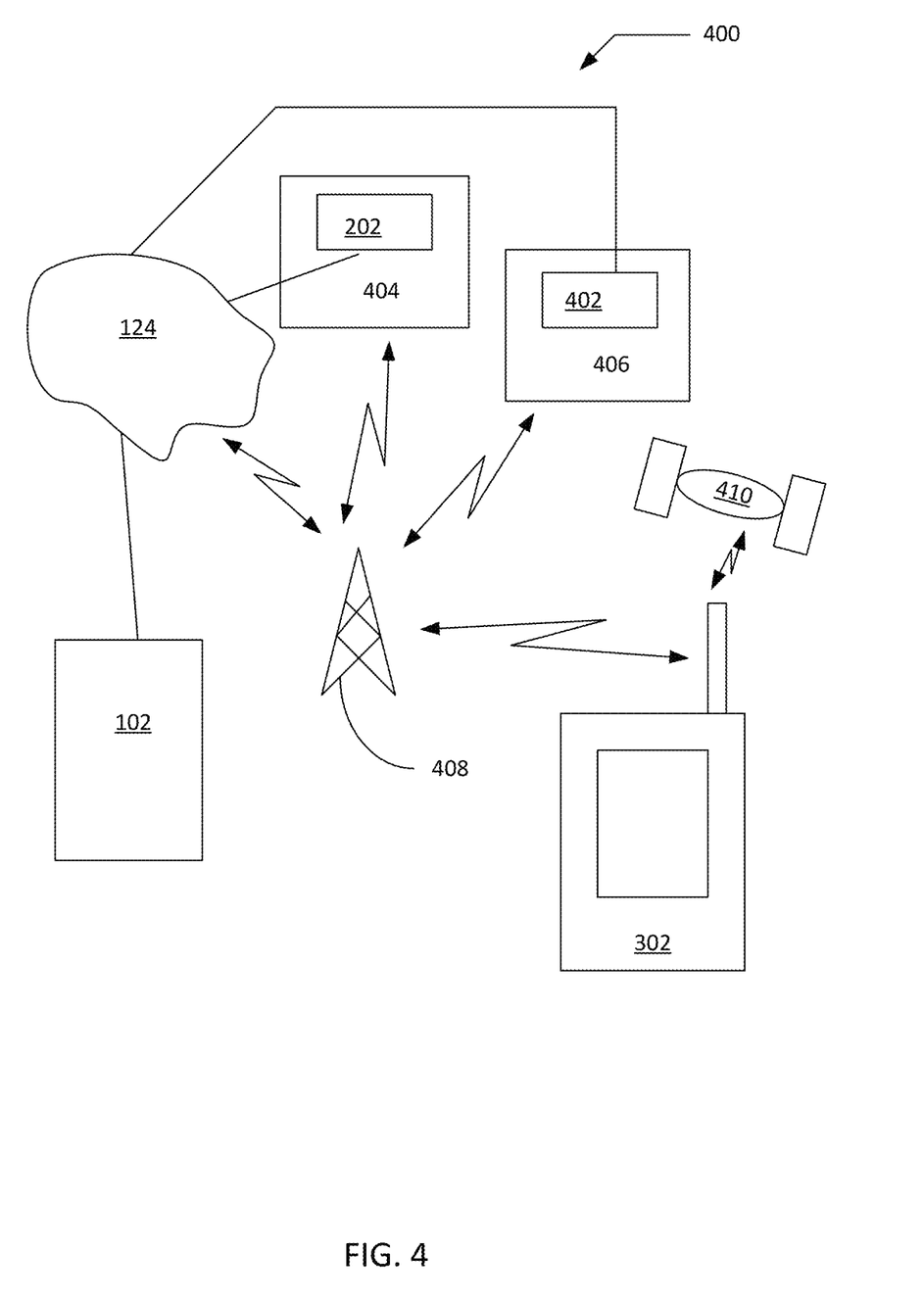
FIG. 4 is an illustration 400 of a location-based mobile shopping computer network connecting local businesses and individual sellers selling items with local shoppers via their MCD 302 of FIG. 3.

FIG. 4 depicts an illustration 400 of a location-based mobile shopping computer network connecting local businesses 404, 406 selling items with local shoppers via their MCD 302 of FIG. 3. The MCD 302 receives location information from a plurality of GPS satellites (represented by satellite 401) and/or cellular network 408. The MCD 302 may also communicate with a data network, such as the internet 124 via wireless internet or the cellular network 408.

A server 102 hosting and/or accessing data for the location-based mobile shopping computer network is connected to the internet 124. Similarly, businesses 404 and 406 with computing devices 202 and 402 respectively are also connected to the internet 124. Depending upon the implementation, the computing devices s 202 and 402 may be connected to the cellular network 408.

The server 102 receives a location identifier from the MCD 302 while a local shopping application is active (e.g., currently executing or "running" via the at least one processor or controller 304, executing the application code in memory 308) on the MCD 302. The location identifier may be generated from GPS satellite 410 data, location data from the cellular network, or other mapping approaches. The location identifier is used at the server 102 to identify information of the requesting user of MCD 302. The application at the server accesses a database or data store 116, and retrieves a group of local businesses and individual sellers offering goods and services for sale in one or more locations in proximity to the location identifier. The proximity may be relative to the location identifier (e.g., within 1 mile of the location identifier, within 100 feet of the location identifier, and so on). The proximity may be, for example, a predetermined range, or a preference specified by the user. The server then transmits data to the MCD 302 that results in display 318 displaying local businesses (404, 406) and individual sellers in real-time chat groups on the MCD 302 for the user (purchaser) of the MCD 302 to access.

The user of the MCD 302 may then communicate through real-time messaging over either the internet 104 or cellular network 408 with the computing devices 202, 402 associated with the respective businesses 404, 406 or individual sellers in real-time chat groups. Goods and services offered by the business 404 and 406 are displayed by the sellers in real-time chat group messages received at the MCD 302. The price or availability of goods (tangible or digital) or services may be provided by the businesses 404, 406 or individual sellers and displayed in the real-time chat group messages. The MCD 302 may display the name, stock keeping unit, bar code, identification number, identification code, description, merchandise image, merchandise video, color, vendor, manufacturer, inventory level, internet address, price, and/or other information about the good or service. It is recognized that not all the information is required to be displayed on MDC 302, but rather are optionally provided. Further, the description may include an image, photograph, or video of, but not limited to, a product or service. In other implementations, multiple MCDs may be grouped into a real-time messaging group with multiple users' MCDs and local businesses 404, 406 and individual sellers all participating in the messaging group. Real-time messaging groups may be open or closed real-time messaging groups that control access to the real-time messaging group (e.g., who can access, whether access is temporary or permanent, and/or other user permissions). Users, businesses, and individual sellers may communicate through the real-time messaging groups via one or more communication channels or options including but not limited to a text or SMS (short message service) message, a push notification, an electronic instant message, an email message, or any combination thereof.

A user notification via the MCD 302 may be generated when additional messages or goods or services are delivered into a real-time messaging group. The notification may be an instant notification presented within local shopping application, but in other implementations may be a text or SMS (short message service) message, a push notification, an electronic instant message, an email message, or any combination of an instant notification, a text message, a push notification, an electronic instant message, and an email message.

The good(s) or service(s) are displayed in the display 318 via a user interface of the local shopping application configured on the MCD 302 to allow a user to purchase the good(s) or service(s), to retrieve more information about the good(s) or service(s), or learn more about the business or individual seller offering the good(s) or service(s). This additional information may be presented via the existing chat group or in some implementations, by direct individual messaging between computing device 202 of the business 404 and the MCD 302.

A search in a real-time messaging group or groups for a good or service may also be conducted from the local shopping application executing on the MCD 302. The server 102 may receive a request from the MCD 302 to initiate a search in a real-time messaging group for a category of a good or service, or for a particular good or service, or similar search requests.

In some respects, an image, photograph, or video may be displayed on a computing device, such as 202 or 402, in an interface configured to allow an individual or business to search for a product or service that is related to goods or service associated with the image, photograph or video.

In another implementation, a server 102 receives a location identifier from the MCD 302 and identifying information of the requesting user. The server 102 retrieves a group of local businesses 404, 406 and individual sellers offering goods and services for sale in the location encompassed by the location identifier using information contained in data store 116. The server 102 allocates the local businesses 404, 406 and individual sellers into real-time chat groups based on similar groupings. A set of messaging groups to render for the MCD 302 based on, but not limited to, characteristics of the location, number of available businesses and individual sellers, time of day, time of year. It is noted that the real-time chat groups may also be aggregated or generated around time-based categories such as, but not limited to, local events, seasons, and festivals.

In other implementations, the server 102 may allow an MCD 302 to create its own real-time messaging group and retrieve a group of local businesses and individual sellers offering goods and services for sale in a particular location.

The location may be specified by the user of MCD 302, or generated automatically based on a current location, or based on a future location which may be known or otherwise predicted (e.g., based upon a known itinerary which may be specified by the user or determined by another process, such as a calendar application which stores information about the user's future plans of when and where the user will be). The MCD 302 may save the real-time messaging group for the user to access later, such as when the user is at the location used to generate the real-time messaging group.

Figure 5:
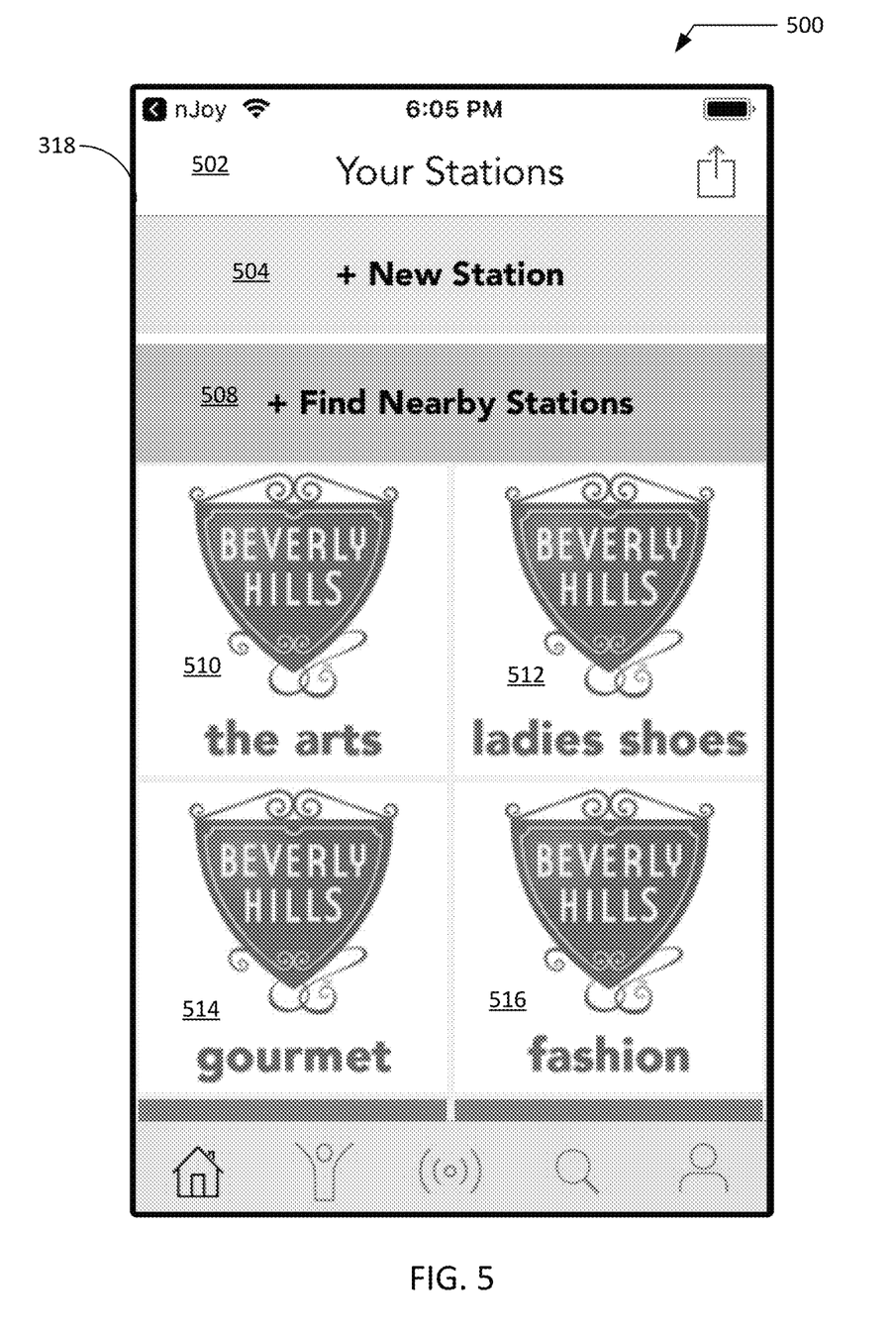
FIG. 5 is a depiction 500 of an interface 502 in the display 318 of MCD 302 of FIG. 3 in accordance with an example implementation.

FIG. 5 illustrates an example user interface 502 for allowing a user to view and/or manage his or her shopping stations in one example implementation, which may be generated by the local shopping application and presented in the display 318 of MCD 302 of FIG. 3, is shown in accordance with an example implementation. The MCD 302 executes instructions for the local shopping application from mobile application memory 320 that generates the interface 502. Interface 502 enables new stations to be defined 504, find nearby stations 508, and groupings of business such as the arts 510, ladies shoes 512, gourmet 514, and fashion 516. Other groupings not shown in interface 502 may also be possible. The definition of new stations results in a new entry in the database or data store 116. The grouping of businesses into categories occurs at server 102. The user of the MCD 302 can select one of the displayed categories for messaging 510, 512, 514, and 516, to receive additional information about businesses, sellers, goods, and services.

Figure 6:
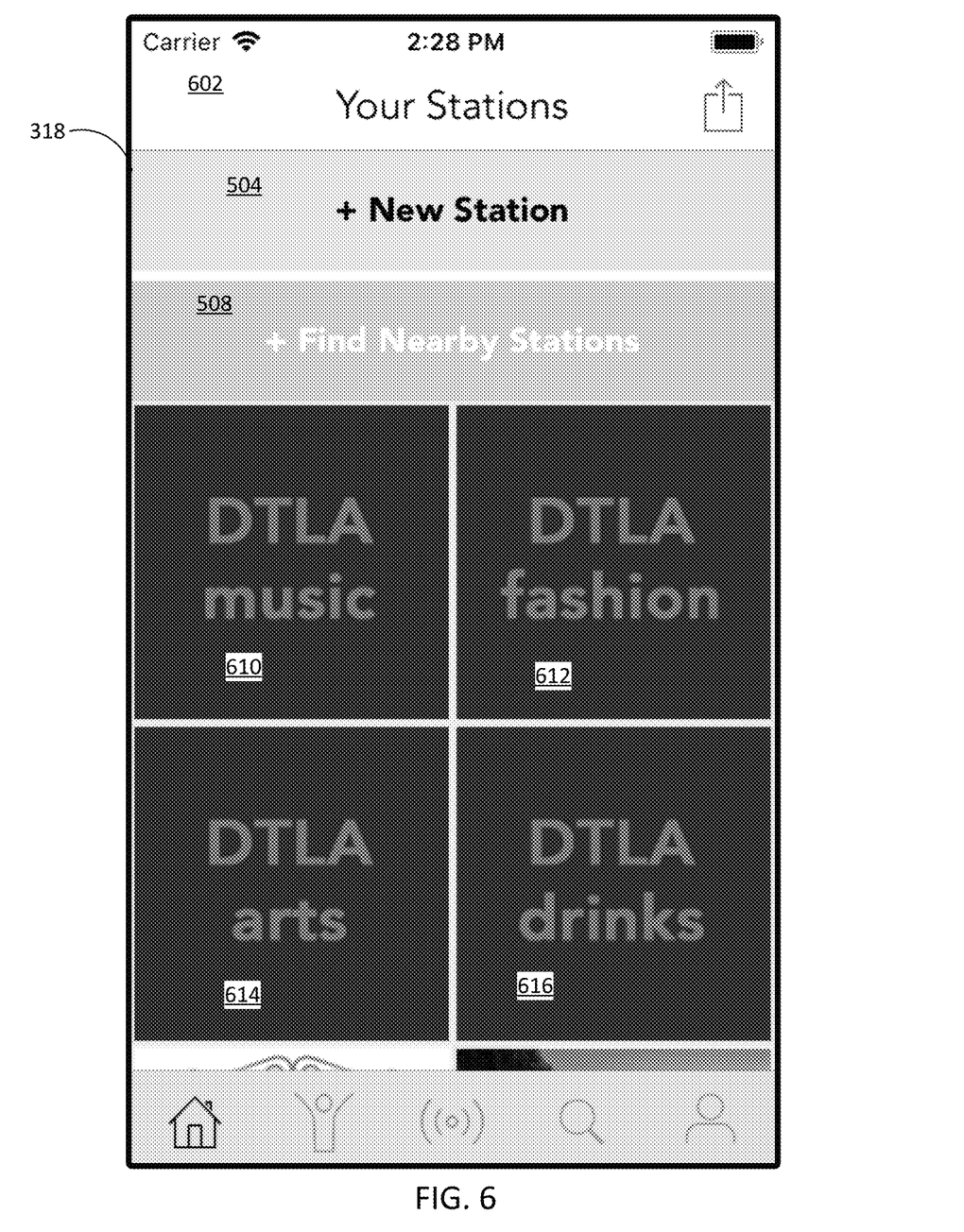
FIG. 6 is a depiction 600 of an interface 602 in the display 318 of MCD 302 of FIG. 3 in accordance with an example implementation.

FIG. 6 illustrates an example user interface 602 for allowing a user to view and/or manage his or her shopping stations in another example implementation, which may be generated by the local shopping application and presented in the display 318 of MCD 302 of FIG. 3. For example, the MCD 302 executes instructions for the local shopping application from mobile application memory 320 in order to generate the user interface 602. As illustrated, user interface 602 can enable the user to define new stations 504, to find nearby stations 508, and to view groupings of businesses or sellers such as the arts 610, ladies shoes 612, gourmet 614, and fashion 616. The grouping of businesses into categories can occur, for example, at server 102. The user of the MCD 302 can select one of the displayed categories 610, 612, 614, and 616 for messaging, for example to receive additional information about businesses, sellers, goods, and services.

Figure 7:
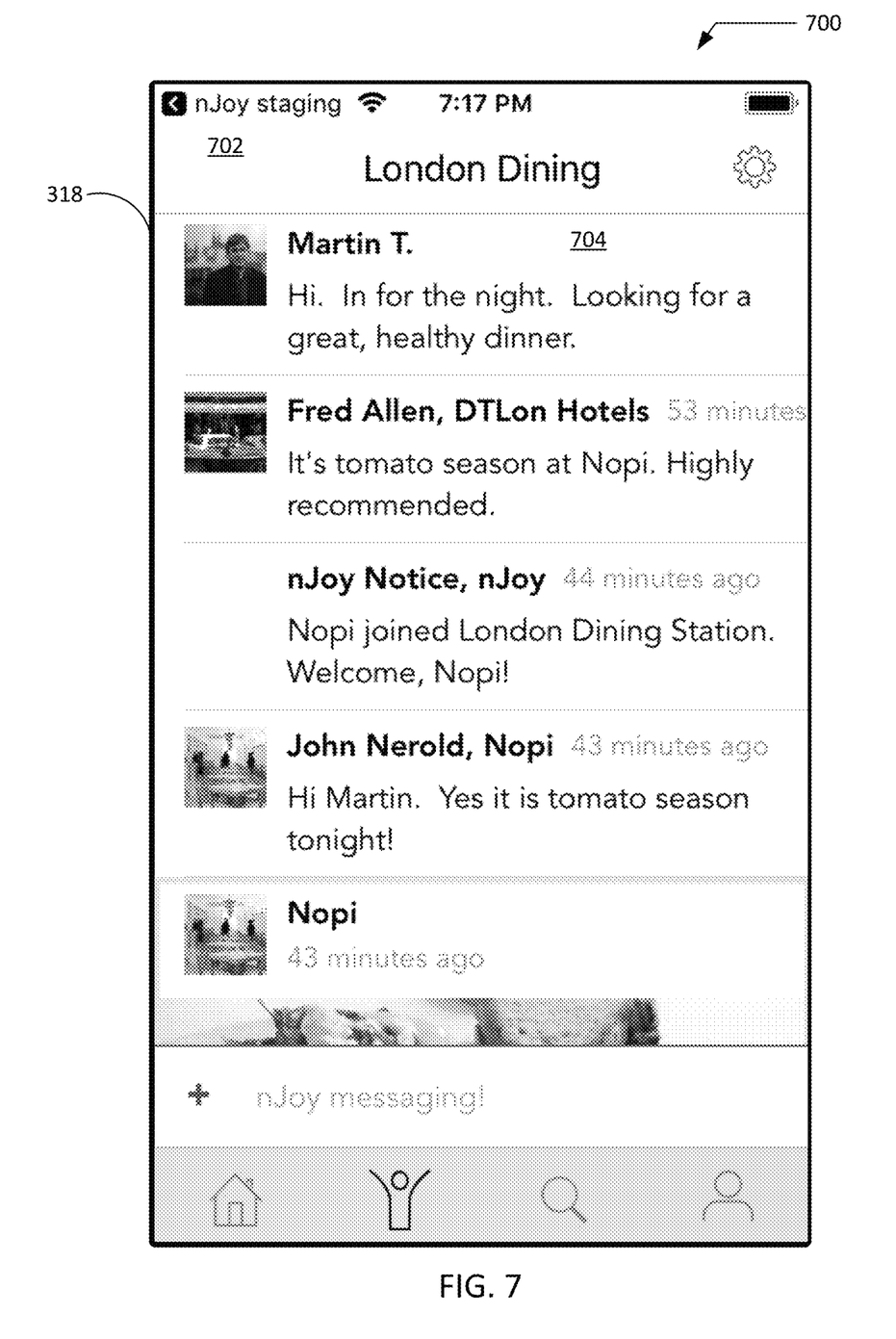
FIG. 7 is a depiction 700 of an interface 702 in the display 318 of MCD 302 of FIG. 3 of a real-time messaging group 704 in accordance with an example implementation.
Figure 8:
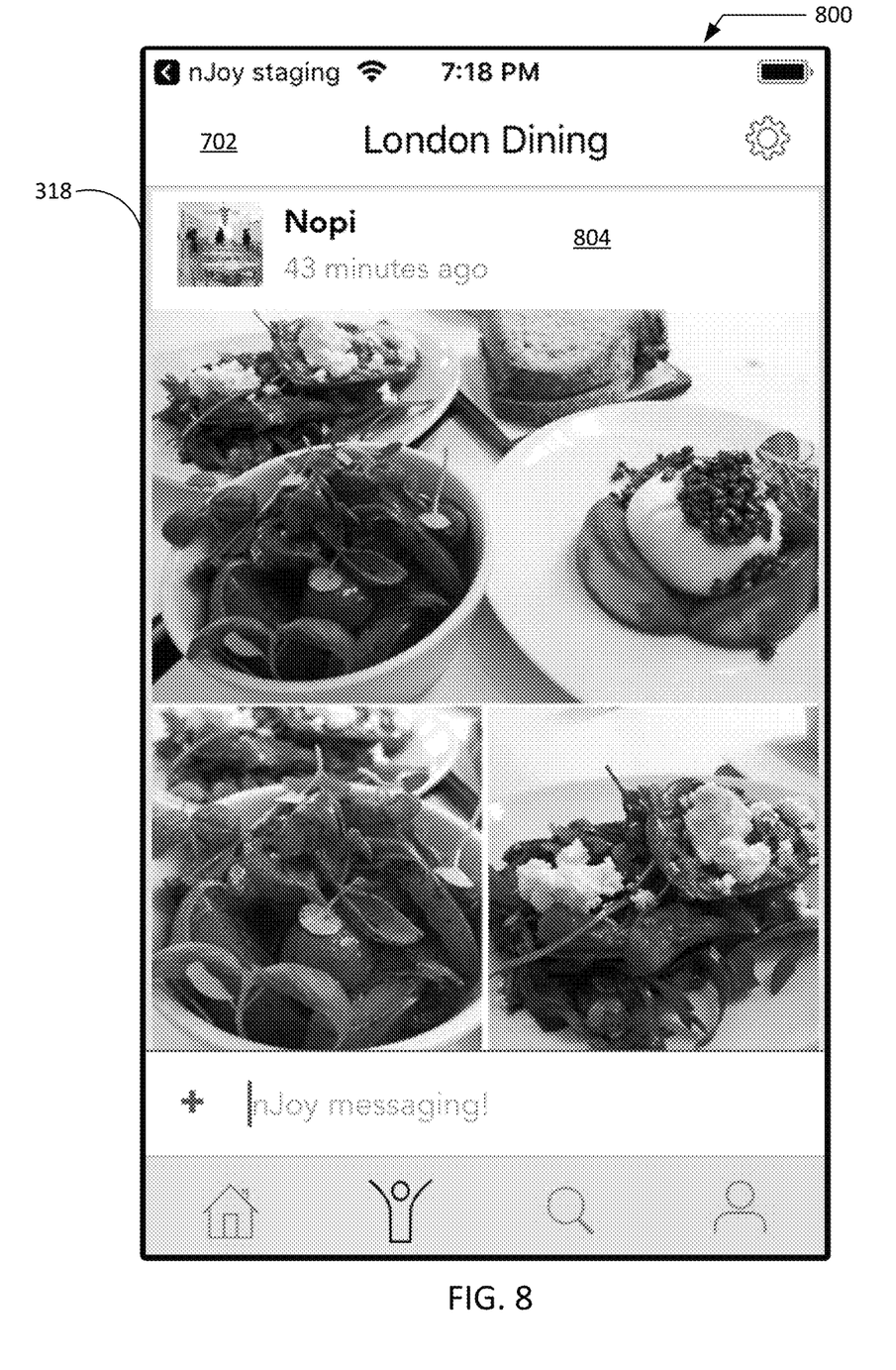
FIG. 8 is a depiction 800 of an interface 702 of FIG. 7 in the display 318 of MCD 302 of FIG. 3 of a real-time messaging group 804 with images in accordance with an example implementation.

FIG. 7 illustrates an example user interface 702 for a user view and send messages as part of a real-time messaging group in one example implementation, which may be generated by the local shopping application and presented in the display 318 of MCD 302 of FIG. 3. In this example, the station title is "London Dining." Interface 702 displays the real-time messaging group 704 with a plurality of messages between business users representing the businesses DTLon Hotels and Nopi Restaurant and at least one shopping user. FIG. 8 continues the view of user interface 702 of FIG. 7, illustrating a real-time messaging group 804 with images embedded in the message as shown in accordance with an example implementation.

Figure 9:
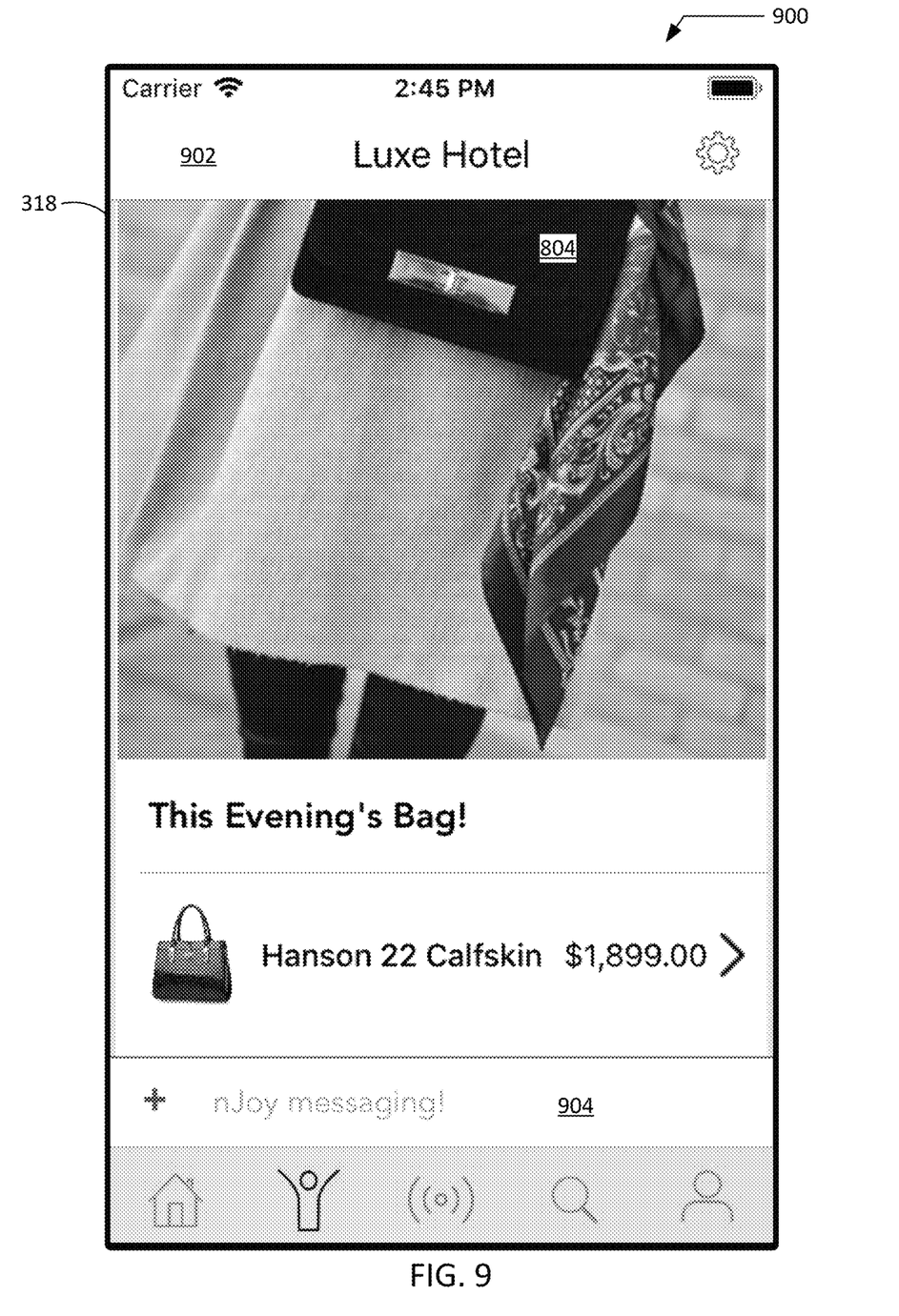
FIG. 9 is a depiction 900 of an interface 902 in the display 318 of MCD 302 of FIG. 3 of the goods offered by a business with a price in accordance with an example implementation.

FIG. 9 illustrates an example user interface 902 for allowing a user to view goods or services offered by a business 404 in one example implementation, which may be generated by the local shopping application and presented in the display 318 of MCD 302 of FIG. 3. In the example a particular product is displayed with an image, a brief description, and a price. A message may be composed in the message section 904 so that, for example, the user can ask questions about the product, and a real-time message is sent via a real-time message group to associated a computing device(s) 202 at business(es) 404.

Figure 10:
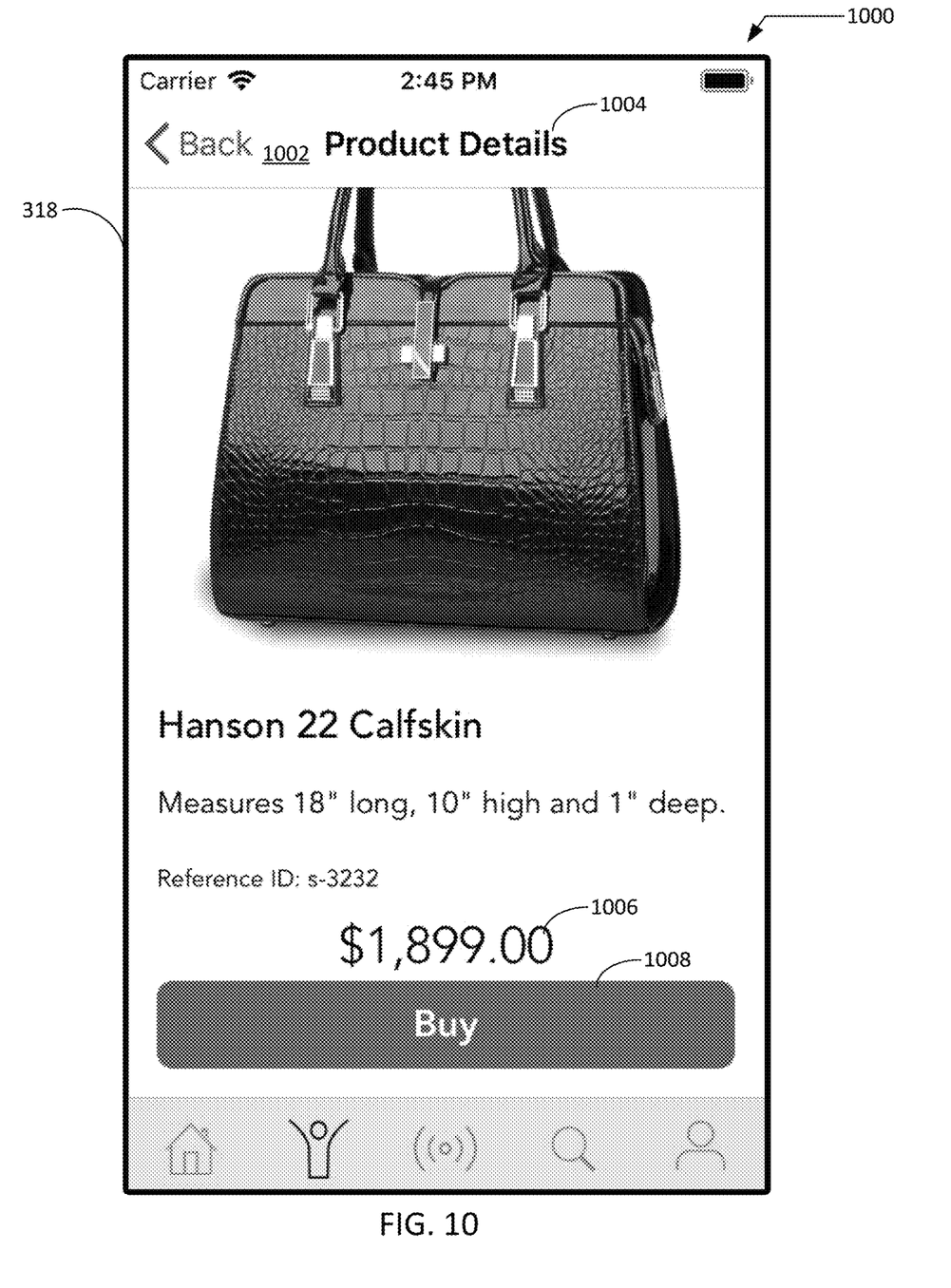
FIG. 10 is a depiction 1000 of an interface 1002 in the display 318 of MCD 302 of FIG. 3 of a product detail's 1004 offered by a business with a price 1006 and buy button 1008 in accordance with an example implementation.

FIG. 10 illustrates an example user interface 1002 for allowing a user to view more product details in one example implementation, which may be generated by the local shopping application and presented in the display 318 of MCD 302 of FIG. 3. User interface 1002 shows product details 1004 offered by a business with a price 1006 and buy button 1008. The user interface 1002 provides product details about a product that is located at a business or seller nearby, which may for example be provided to the user's MCD 302 by a business 404. The user at the MCD 302 may be presented with an option to purchase the product by selecting the buy button 1008. The purchase transaction may then be carried out by the business, such as business 404. In other implementations, the transaction may occur at the server 102 with payment information received via the MCD 302 and appropriate corresponding credit being generated for the business 402.

Figure 11:
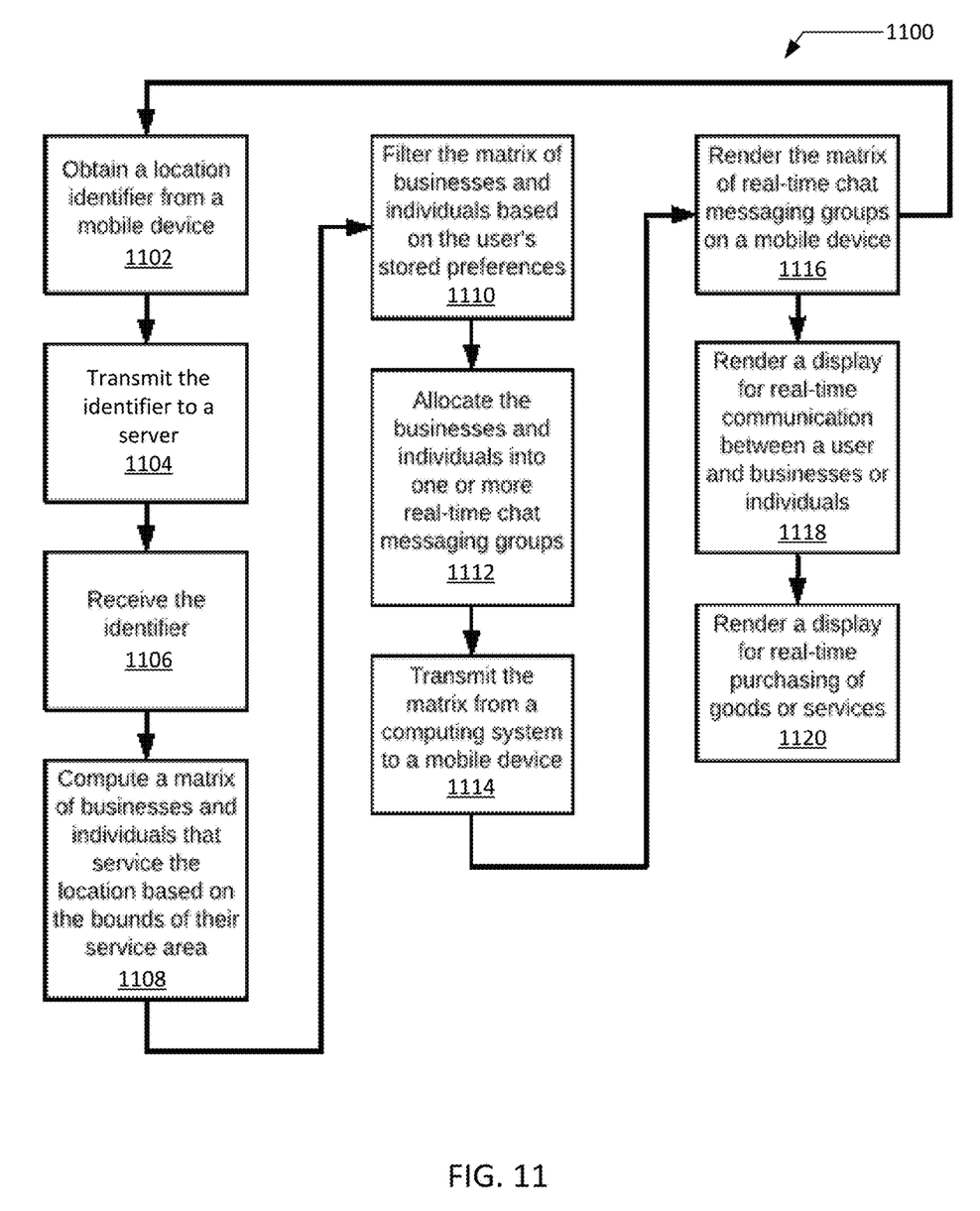
FIG. 11 is a flowchart 1100 illustrating a process implemented by a location-based mobile shopping network according to an exemplary embodiment.

FIG. 11 schematically illustrates a logical flow diagram of a process 1100 for providing a location-based mobile shopping network according to an exemplary embodiment. The process 1100 may be executed, for example, by server 102 of FIG. 1. In one embodiment, the process 1100 may also be executed in whole or in part by MCD 302, in communication with the server 102. In various embodiments, fewer blocks or additional blocks may be included in the process, or various blocks may be performed in an order different from that shown in FIG. 11. For ease of illustration, the process 1100 will be described as being executed in part by the MCD 302 and in part by the server 102.

The process 1100 starts at step 1102 with the mobile application (e.g., the local shopping app) obtaining a location identifier from the MCD 302. The MCD 302 transmits the location identifier to the server 102 in step 1104. The server receives the location identifiers in step 1106. In step 1108, the server computes a collection (or matrix) of businesses and individual sellers, based at least in part on the received location identifiers and on the bounds of service area associated with businesses and individual sellers. The bounds of service area data may be retrieved from, for example, a data store 116. At step 1110, the server 102 filters the list of businesses and individual sellers based on the user's stored preferences, which may also be located in and retrieved from the data store 116. At step 1112, the server 102 allocates the businesses and individual sellers into one or more real-time chat messaging groups. At step 1114, the server 102 then transmits the matrix of real-time chat messaging groups to the MCD 302. The MCD 302 running the mobile application displays the matrix of real-time chat messaging groups in the MCD's interface in step 1116. At step 1118, the user, via the MCD 302, can communicate with a business 402 and individual sellers. At step 1120, the user may be offered the opportunity to purchase goods or services.

It will be understood and is appreciated by persons skilled in the art, that one or more processes, sub-processes, or process steps described in connection with FIG. 11 may be performed by hardware and/or software (machine-readable instructions). If the approach is performed by software, the software may reside in software memory in a suitable electronic processing component or system such as one or more of the functional components or modules schematically depicted in the figures.

The software in software memory may include an ordered listing of executable instructions for implementing logical functions (that is, "logic" that may be implemented either in digital forms such as digital circuitry or source code or in analog forms such as analog circuitry or an analog source such an analog electrical, sound or video signal), and may selectively be embodied in any computer-readable medium for use by or in connection with an instruction execution system, apparatus, or device, such as a computer-based system, processor containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, or semiconductor system, apparatus, or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in computer memory.

Additional Embodiments

In general, any of the routines, processes, methods, or criteria disclosed herein for providing a location-based mobile shopping computer network can be used individually or in combination with any of the other routines, processes, methods or criteria disclosed herein.

In some embodiments, the server 102 may be configured differently, include different components or modules, and/or omit some components or modules shown in FIG. 1. For example, in one embodiment, server 102 includes one or more hardware processors in communication with a computer readable medium storing software modules including instructions that are executable by the one or more hardware processors, and one or more software modules. The one or more hardware processors may include, for example, digital logic circuitry. The one or more software modules may instruct a computing system to execute the various methods, approaches, and/or techniques as described herein.

As described above, the server 102 can be implemented by a computing system that includes one or more physical servers or other computing machines, such as several computing machines interconnected via a network. Thus, each of the components depicted in the server 102 can include hardware and/or software for performing various features. In one embodiment, the server 102 is implemented in association with a web site or collection of web sites. Various disclosed features can be incorporated into a mobile device operating system, a mobile application, a sport league administration site or service, a social networking service, or any combination of these.

The server 102 can include one or more servers for receiving and responding to network requests from the mobile computing device(s) 302 and/or business computing devices 402. The one or more servers can include web servers, application servers, database servers, combinations of the same, or the like. In some embodiments, the Internet/cloud 124 is a publicly accessible network of linked networks, possibly operated by various distinct parties, such as the Internet. In other embodiments, the Internet/cloud 124 may be a private network, such as, for example, a corporate or university network that is wholly or partially inaccessible to non-privileged users. In still other embodiments, the Internet/cloud 124 may include one or more private networks with access to and/or from the Internet.

The processing of the various components of the server 102 can be distributed across multiple machines, networks, and other computing resources. The various components of the server 102 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the server 102 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, the server 102 may be implemented on, or in communication with, one or more hosted computing environments. The hosted computing environments may include a collection of rapidly provisioned and released computing resources hosted in connection with the server 102. Such computing resources may be referred to, individually, as host computing devices. The computing resources may further include a number of computing, networking, and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. A hosted computing environment may also be referred to as a cloud computing environment.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

I claim:

1. A computing system for providing a location-based mobile messaging shopping network, the computing system comprising:
   a data store configured to store (1) user profile data for a plurality of users of the location-based mobile messaging shopping network and (2) business profile data for a plurality of businesses providing goods or services to users of the location-based mobile messaging shopping network;
   one or more processors; and
   an application module executable on the one or more processors, the application module configured to at least:
   receive location data generated by and associated with a mobile computing device (MCD);
   determine, based on the location data associated with the MCD, a service area location, wherein the service area location is associated with one or more businesses or individual sellers;
   generate a collection of one or more businesses or individual sellers offering a plurality of goods or services for purchase in the determined service area location;
   establish a real-time communication channel between the one or more businesses or individual sellers and the MCD;
   provide the collection of one or more businesses or individual sellers to the MCD, wherein the MCD is configured to display the collection of one or more businesses or individual sellers with one or more real-time communication channel options by which a user of the MCD can send a message to a selected one of the businesses or individual sellers, wherein said message is communicated directly from the MCD to the selected one of the businesses or individual sellers through the real-time communication channel established by the computer server; and
   facilitate, through the real-time communication channel, a purchase of a good or service by the user of the MCD from the selected one of the businesses or individual sellers.

2. The computing system of claim 1, wherein the real-time communication channel is a text or SMS (short message service) message.

3. The computing system of claim 1, wherein the good or service consists of a service, a tangible good, or a digital good.

4. The computing system of claim 1, wherein the application module is further configured to provide product information for the good or service, wherein the product information includes the name, stock keeping unit, bar code, identification number, identification code, description, merchandise image, merchandise video, color, vendor, manufacturer, inventory level, internet address, or price of the good or service.

5. The computing system of claim 1, wherein the application module is further configured to initiate a search for a product category or a particular good or service, wherein the search is requested by the user and received from the MCD.

6. The computing system of claim 1, wherein the established real-time communication channel is a real-time chat group comprising (1) the user and (2) the one or more businesses or individual sellers, wherein the user can communicate with the one or more businesses or individual sellers substantially simultaneously in the real-time chat group.

7. Non-transitory computer storage which stores executable program instructions that direct a computing system comprising one or more computing devices to perform a process that comprises:
   receiving, at a computer server, location data generated by and associated with a mobile computing device (MCD);
   determining, by the computer server, based on the location data associated with the MCD, a service area location, wherein the service area location is associated with one or more businesses or individual sellers;
   generating a collection of one or more businesses or individual sellers offering a plurality of goods or services for purchase in the determined service area location;

establishing a real-time communication channel between the one or more businesses or individual sellers and the MCD;

providing the collection of one or more businesses or individual sellers to the MCD, wherein the MCD is configured to display the collection of one or more businesses or individual sellers with one or more real-time communication channel options by which a user of the MCD can send a message to a selected one of the businesses or individual sellers, wherein said message is communicated directly from the MCD to the selected one of the businesses or individual sellers through a real-time communication channel established by the computer server; and facilitating, through the real-time communication channel, a purchase of a good or service by the user of the MCD from the selected one of the businesses or individual sellers.

8. The non-transitory computer storage of claim 7, wherein the real-time communication channel is push notification for display on the MCD.

9. The non-transitory computer storage of claim 7, wherein the good or service consists of a service, a tangible good, or a digital good.

10. The non-transitory computer storage of claim 7, wherein the process further comprises providing, to the MCD, product information for the good or service.

11. The non-transitory computer storage of claim 7, wherein the process further comprises searching for a product category or a particular good or service, based on a search request initiated by the user as received from the MCD.

12. A computerized method for providing a location-based mobile messaging shopping network, the computerized method comprising:

receiving, at a computer server, location data generated by and associated with a mobile computing device (MCD);

determining, by the computer server, based on the location data associated with the MCD, a service area location, wherein the service area location is associated with one or more businesses or individual sellers;

generating a collection of one or more businesses or individual sellers offering a plurality of goods or services for purchase in the determined service area location;

establishing a real-time communication channel between the one or more businesses or individual sellers and the MCD;

providing the collection of one or more businesses or individual sellers to the MCD, wherein the MCD is configured to display the collection of one or more businesses or individual sellers with a one or more real-time communication channel options by which a user of the MCD can send a message to a selected one of the businesses or individual sellers, wherein said message is communicated directly from the MCD to the selected one of the businesses or individual sellers through the real-time communication channel established by the computer server; and searching for a product category or a particular good or service, based on a search request initiated by the user as received from the MCD.

13. The computerized method of claim 12, wherein the real-time communication channel is a text message channel or SMS (short message service).

14. The computerized method of claim 12, further comprising: facilitating, through the real-time communication channel, a purchase of a good or service by the user of the MCD from the selected one of the businesses or individual sellers.

15. The computerized method of claim 12, further comprising: providing, to the MCD, product information for the good or service.

16. The computerized method of claim 12, wherein the established real-time communication channel is a real-time chat group comprising (1) the user and (2) the one or more businesses or individual sellers, wherein the user can communicate with the one or more businesses or individual sellers substantially simultaneously in the real-time chat group.

17. A computerized method for providing a location-based mobile messaging shopping network, the computerized method comprising:

generating, at a mobile computing device (MCD), location data associated with the MCD;

providing the location data associated with the MCD to a remote computer server, wherein the remote computer server is configured to determine a service area location, based on the location data associated with the MCD, wherein the service area location is associated with one or more businesses or individual sellers;

receiving, from the remote computer server, a collection of one or more businesses or individual sellers offering a plurality of goods or services for purchase in the determined service area location;

displaying the collection of one or more businesses or individual sellers with a one or more real-time communication options by which a user of the MCD can send a message to a selected one of the businesses or individual sellers, wherein said message is communicated directly from the MCD to the selected one of the businesses or individual sellers through a real-time communication channel established by the remote computer server; and enabling the user of the MCD to purchase of a good or service from the selected one of the businesses or individual sellers, wherein the purchase is conducted through the established real-time communication channel.

18. The computerized method of claim 17, further comprising: allowing the user to request more information about the good or service.

19. The computerized method of claim 17, further comprising displaying product information for the good or service, wherein the product information includes the name, stock keeping unit, bar code, identification number, identification code, description, merchandise image, merchandise video, color, vendor, manufacturer, inventory level, internet address, or price of the good or service.

20. The computerized method of claim 17, wherein the established real-time communication channel is a real-time chat group comprising (1) the user and (2) the one or more businesses or individual sellers, wherein the user can communicate with the one or more businesses or individual sellers substantially simultaneously in the real-time chat group.

* * * * *